United States Patent
Spiegel et al.

(10) Patent No.: US 7,159,149 B2
(45) Date of Patent: Jan. 2, 2007

(54) HEURISTIC DETECTION AND TERMINATION OF FAST SPREADING NETWORK WORM ATTACKS

(75) Inventors: Mark Spiegel, West Hills, CA (US); Bruce McCorkendale, Los Angeles, CA (US); William Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 541 days.

(21) Appl. No.: 10/280,586

(22) Filed: Oct. 24, 2002

(65) Prior Publication Data

US 2004/0083408 A1   Apr. 29, 2004

(51) Int. Cl.
    *G06F 11/00*  (2006.01)
(52) U.S. Cl. .................. 714/43; 726/22; 726/23; 726/24; 709/224
(58) Field of Classification Search .............. 714/39, 714/43, 48; 713/200, 201
    See application file for complete search history.

(56) References Cited

U.S. PATENT DOCUMENTS

| | | | |
|---|---|---|---|
| 5,440,723 A * | 8/1995 | Arnold et al. ............. | 714/2 |
| 5,452,442 A | 9/1995 | Kephart | |
| 5,473,769 A | 12/1995 | Cozza | |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 6,052,709 A | 4/2000 | Paul et al. | |
| 6,070,244 A * | 5/2000 | Orchier et al. ............. | 713/201 |
| 6,072,830 A | 6/2000 | Proctor et al. | |
| 6,088,803 A | 7/2000 | Tso et al. | |
| 6,094,731 A | 7/2000 | Waldin et al. | |
| 6,104,872 A | 8/2000 | Kubota et al. | |

(Continued)

FOREIGN PATENT DOCUMENTS

DE   100 21 686 A1   11/2001

(Continued)

OTHER PUBLICATIONS

Toth et al. "Connection-history based anomaly detection." Proceedings of the 2002 IEEE Workshop on Information Assurance and Security. West Point, NY, Jun. 17-19, 2002. pp. 30-35.*

(Continued)

*Primary Examiner*—Robert Beausoliel
*Assistant Examiner*—Philip Guyton
(74) *Attorney, Agent, or Firm*—Fenwick & West LLP (57) ABSTRACT

Methods, apparati, and computer program products for detecting and responding to fast-spreading network worm attacks include a network monitoring module (110), which observes (205) failed network connection attempts from multiple sources. A logging module (120) logs (220) the failed connection attempts. An analysis module (150) uses the logged data on the failed connection attempts to determine (225) whether a sources is infected with a worm using a set of threshold criteria. The threshold criteria indicate whether a source's failed connection attempts are non-normal. In one embodiment, a response module (160) responds (240) to the computer worm by, e.g., alerting a user or system administrator, terminating an infected process (20), or terminating the infected source's network access.

34 Claims, 3 Drawing Sheets

U.S. PATENT DOCUMENTS

| | | | |
|---|---|---|---|
| 6,108,799 | A | 8/2000 | Boulay et al. |
| 6,167,434 | A | 12/2000 | Pang |
| 6,192,379 | B1 | 2/2001 | Bekenn |
| 6,199,181 | B1 | 3/2001 | Rechef et al. |
| 6,275,938 | B1 | 8/2001 | Bond et al. |
| 6,338,141 | B1 | 1/2002 | Wells |
| 6,357,008 | B1 | 3/2002 | Nachenberg |
| 6,370,648 | B1* | 4/2002 | Diep ............... 713/201 |
| 6,493,007 | B1 | 12/2002 | Pang |
| 6,535,891 | B1 | 3/2003 | Fisher et al. |
| 6,552,814 | B1 | 4/2003 | Okimoto et al. |
| 6,611,925 | B1 | 8/2003 | Spear |
| 6,622,150 | B1 | 9/2003 | Kouznetsov et al. |
| 6,678,734 | B1 | 1/2004 | Haatainen et al. |
| 6,697,950 | B1 | 2/2004 | Ko |
| 6,721,721 | B1 | 4/2004 | Bates et al. |
| 6,748,534 | B1 | 6/2004 | Gryaznov et al. |
| 6,763,462 | B1 | 7/2004 | Marsh |
| 6,813,712 | B1 | 11/2004 | Luke |
| 6,851,057 | B1 | 2/2005 | Nachenberg |
| 6,910,134 | B1 | 6/2005 | Maher et al. |
| 2002/0004908 | A1 | 1/2002 | Galea |
| 2002/0035696 | A1 | 3/2002 | Thacker |
| 2002/0046275 | A1* | 4/2002 | Crosbie et al. ............ 709/224 |
| 2002/0083175 | A1 | 6/2002 | Afek et al. |
| 2002/0091940 | A1 | 7/2002 | Wellborn et al. |
| 2002/0157008 | A1 | 10/2002 | Radatti |
| 2002/0162015 | A1 | 10/2002 | Tang |
| 2002/0178374 | A1 | 11/2002 | Swimmer et al. |
| 2003/0023865 | A1 | 1/2003 | Cowie et al. |
| 2003/0051026 | A1* | 3/2003 | Carter et al. ............ 709/224 |
| 2003/0065926 | A1 | 4/2003 | Schultz et al. |
| 2003/0115485 | A1* | 6/2003 | Milliken ............ 713/201 |
| 2003/0120951 | A1 | 6/2003 | Gartside et al. |
| 2003/0126449 | A1 | 7/2003 | Kelly et al. |
| 2003/0140049 | A1 | 7/2003 | Radatti |
| 2003/0191966 | A1* | 10/2003 | Gleichauf ............ 713/201 |
| 2003/0212902 | A1 | 11/2003 | van der Made |
| 2003/0236995 | A1* | 12/2003 | Fretwell, Jr. ............ 713/200 |
| 2004/0015712 | A1 | 1/2004 | Szor |
| 2004/0015726 | A1 | 1/2004 | Szor |
| 2004/0030913 | A1 | 2/2004 | Liang et al. |
| 2004/0158730 | A1 | 8/2004 | Sarkar |
| 2004/0162808 | A1 | 8/2004 | Margolus et al. |
| 2004/0181687 | A1 | 9/2004 | Nachenberg et al. |
| 2005/0021740 | A1* | 1/2005 | Bar et al. ............ 709/224 |
| 2005/0044406 | A1* | 2/2005 | Stute ............ 713/201 |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2006/0064755 | A1 | 3/2006 | Azadet et al. |

FOREIGN PATENT DOCUMENTS

| | | |
|---|---|---|
| EP | 1 280 039 A | 1/2003 |
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Bakos et al. "Early Detection of Internet Worm Activity by Metering ICMP Detination Unreachable Activity." Proc. of SPIE Conference on Sensors, and Command, Control, Communications and Intelligence, Orlando, Apr. 2002.*

Delio, M., "*Virus Throttle a Hopeful Defense*", Wired News, retrieved from internet http://www.wired.com/news/print/ 0,1294,56753,00.html Jan. 7, 2003.

Williamson, M., "*Throttling Viruses: Restricting Propagation to Defeat Malicious Mobile Code*", Hewlett-Packard, pp. 1-6, Jun. 17, 2002.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/ standalone/pelican/sc_pelican.html.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www//symantec.com/press/1999/n991001. html>. Author unknown.

Szor, P. and Ferrie, P., Attacks on Win32, Virus Bulletin Conference, Sep. 1998, Virus Bulletin Ltd:, The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default. aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http://www.wackyb.co. nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36, Sep. 4, 1992, pp. 44-47.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Kephart Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

* cited by examiner

HEURISTIC DETECTION AND TERMINATION OF FAST SPREADING NETWORK WORM ATTACKS

TECHNICAL FIELD

This invention pertains to the field of countering computer worm attacks, and in particular to a heuristic for detecting and responding to fast-spreading network worm attacks.

BACKGROUND ART

Computer viruses and worms are types of "malicious code," which is defined herein as any computer program, module, or code that enters a computer system or other computing device without an authorized user's knowledge and/or without an authorized user's consent. In particular, a computer worm is malicious code that has the ability to replicate itself from one computer to another, e.g., over a computer network. The network may be a closed proprietary network or an open network such as the Internet. Ször, Péter, "Attacks on Win32," *Proceedings of the Virus Bulletin Conference*, October 1998, England, and Ször, Péter, "Attacks on Win32—Part II," *Proceedings of the Virus Bulletin Conference*, September 2000, England, describe various attacks by malicious code, including worms, on computer systems, with particular applicability to the Win32 API (Application Programming Interface) of Microsoft Corporation.

Modem, fast-spreading computer worms such as CodeRed and Nimda spread over the Internet by searching for vulnerable computer systems. During these searches, the computer worm may attempt thousands (or more) of connections to essentially random addresses. Because of the large number of possible addresses relative to the number of valid addresses, most of these attempted network connections fail. A worm that has a relatively high rate of connection attempts is potentially more dangerous because it can spread faster. However, such a fast-spreading worm will also tend to generate more failed connection attempts.

As writers of malicious code continue to develop fast-spreading computer worms, the need persists for reliable techniques for detecting these worms and responding to them as early as possible in order to minimize any damage they can do.

DISCLOSURE OF INVENTION

Figure 3:
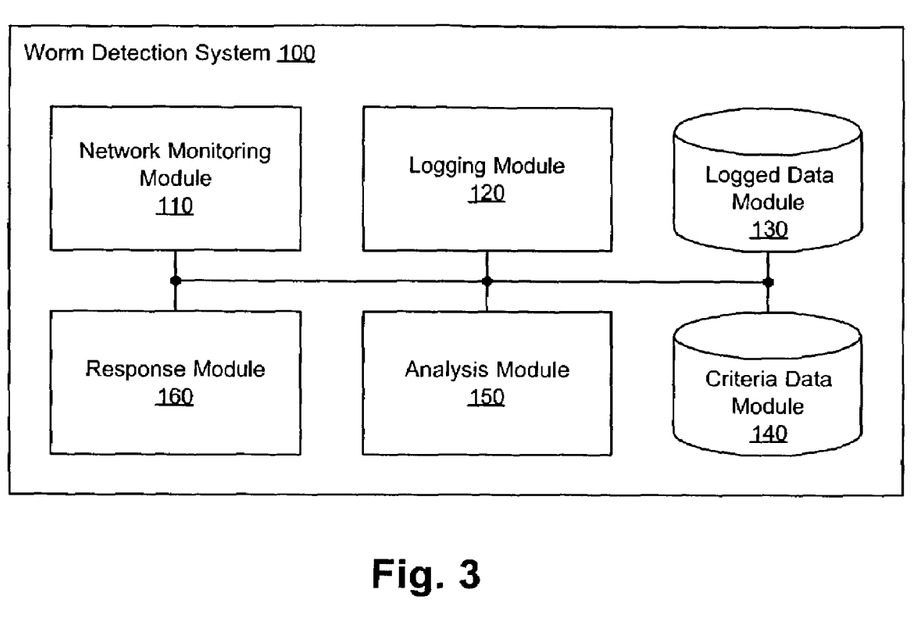
FIG. 3 is a block diagram illustrating modules of the worm detection system (WDS) 100 according to an embodiment of the present invention.
Figure 4:
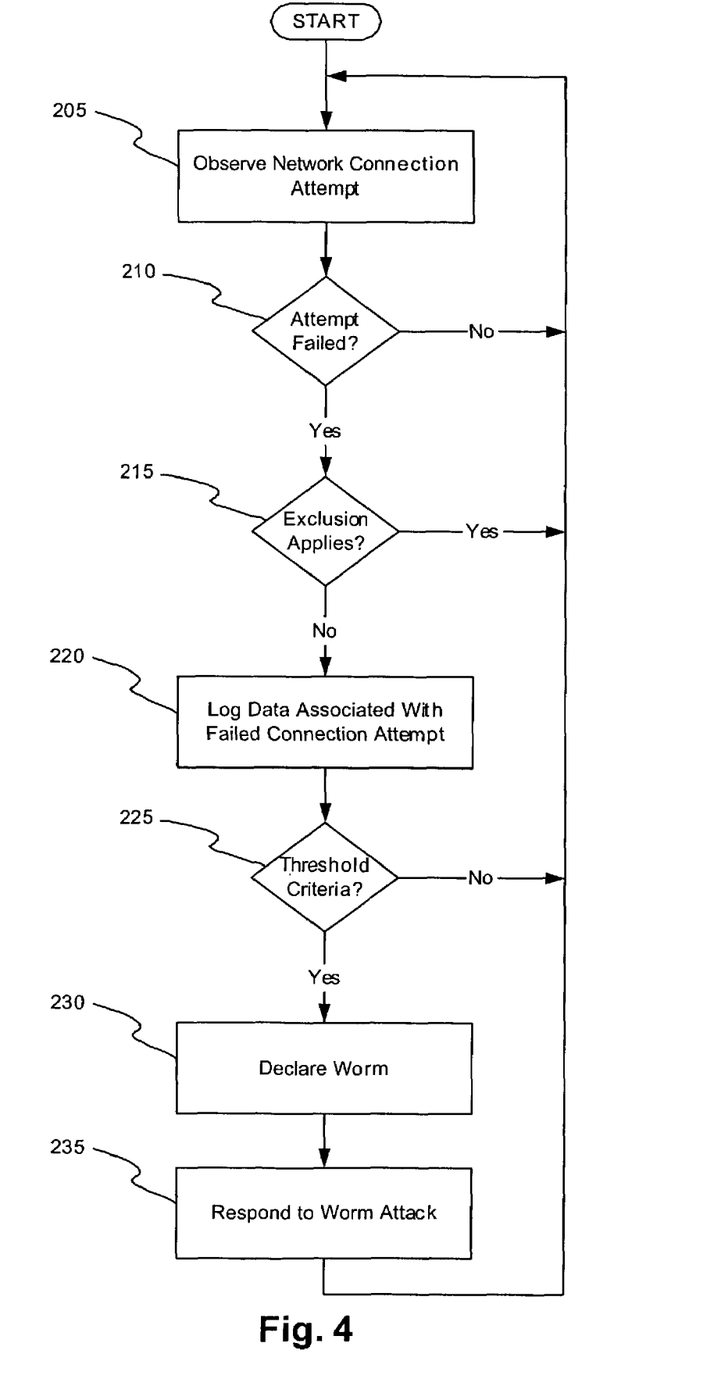
FIG. 4 is a flowchart illustrating the operation of the WDS 100 to detect the presence of computer worms according to an embodiment of the present invention.

The present invention comprises methods, apparati, and computer program products for detecting and responding to fast-spreading network worm attacks. In one embodiment, a network monitoring module (110) observes (205) failed network connection attempts from multiple sources (10,20). Each failed network connection attempt originates from any of a set of sources (10,20) and is directed to a destination network address on a network (50). In one embodiment, the sources (10,20) include network devices (10), and in another embodiment, the sources include processes (20) running on a network device (10). A logging module (120) logs (220) the failed connection attempts, e.g., in a logged data module (130). An analysis module (150) uses the logged data on the failed connection attempts to determine (225) whether a source (10,20) is infected with a worm. In one embodiment, this determination is based on a set of threshold criteria. The threshold criteria implement a heuristic for determining whether the failed connection attempts associated with a source (10,20) are non-normal, indicating that the source is infected.

The threshold criteria for non-normalcy can implement the heuristic in a variety of ways. In various embodiments, the threshold criteria include one or more of: the number of failed network connection attempts; the diversity of destination network addresses associated with the failed network connection attempts; the randomness of the failed addresses; and a weighting for each failed network connection attempt according to an attribute thereof (e.g., source or destination address). In other embodiments, different threshold criteria are applied to different sources depending on the source, and one or more sources may be excluded completely from the threshold criteria.

In one embodiment, if the analysis module (150) declares (230) the presence of a computer worm, a response module (160) responds (240) to the computer worm. The response may include alerting a user or system administrator, terminating an infected process (20), and terminating the infected source's network access.

BRIEF DESCRIPTION OF THE DRAWINGS

These and other more detailed and specific objects and features of the present invention are more fully disclosed in the following specification, reference being had to the accompany drawings, in which.

DETAILED DESCRIPTION OF THE PREFERRED EMBODIMENTS

Computer worms typically generate a relatively high number of failed network connection attempts as they attempt to infect other computer systems over a network. Embodiments of the present invention provide a heuristic to detect these computer worms by monitoring network connection attempts and noting any abnormal activity. Once a worm attack is detected, the attack can be addressed by alerting a user or system administrator to the worm, or by terminating the offending entity or denying its access to the network. These functions are carried out by a worm detection system (WDS) 100.

Figure 1:
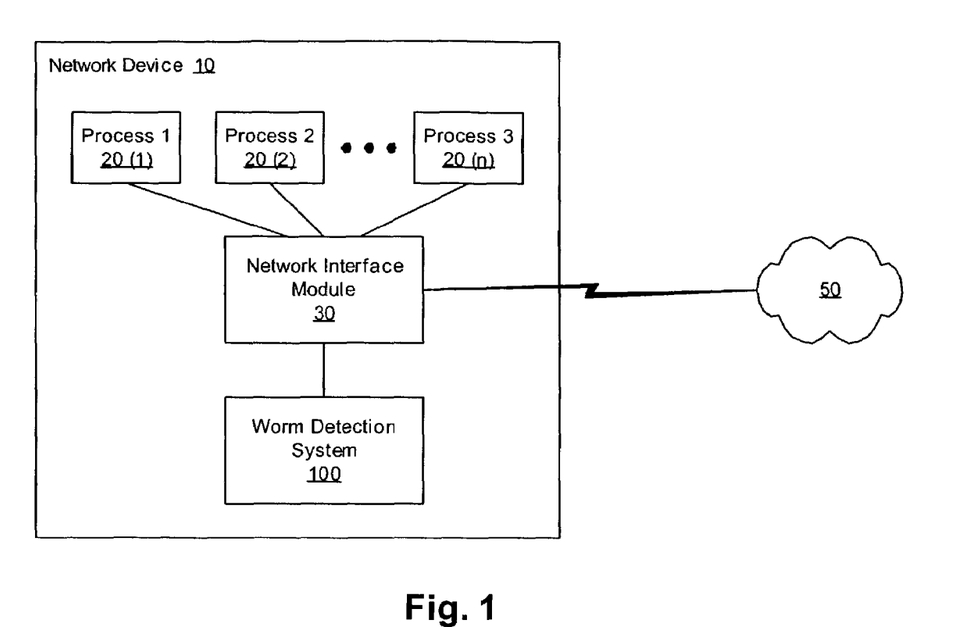
FIG. 1 is a block diagram of a host-based embodiment of the present invention.

FIG. 1 is a diagram of a "host-based" embodiment of the present invention in which a WDS 100 runs as a software program on a network device 10. In one embodiment, the network device 10 is a computer system; however, the WDS 100 can be used to protect any of a variety of other types of network devices that are susceptible to worm attacks. Therefore, as used herein, the definition of "network device" encompasses not only computer systems such as desktop computers and laptops, but also personal data assistants (PDA), mobile phones, home appliances with network capability, and any other electronic devices that are susceptible to worm attacks. In other embodiments, such as where the network device 10 is a mobile phone, the WDS 100 may be implemented as software, hardware, or firmware, or any combination thereof. Moreover, although FIG. 1 shows the WDS 100 running on the network device 10, one or more of the function modules of the WDS 100 (shown in greater detail in FIG. 3) may be stored and/or executed on a remote system coupled to the network device 10.

The network device 10 is capable of running one or more processes 20, each of which is typically an instance of a program or code being executed by the device 10. In a computer system, several processes are typically running at the same time. The processes 20 are coupled to a network interface module 30 for communicating messages over a network 50. The network 50 comprises any type of communications medium over which a worm can spread, including the Internet, LAN, WAN, VPN, or a wireless network such as a cellular or PCS network. The processes 20 communicate with other network devices by transmitting messages (such as connection attempts) to a destination address on the network 50. In this embodiment, therefore, a process 20 is referred to herein as a "source" associated with a connection attempt. Depending on the type of network device 10 and network 50, any suitable communications protocol can be used, such as TCP/IP.

A process 20 that is running on the network device 10 may be infected with a computer worm. If infected, a process 20 is likely to produce a relatively large number of connection attempts to remote destination addresses over a given period of time. A relatively high fraction of these connection attempts are expected to fail because of the large number of possible destination addresses, and because the destination addresses are typically chosen at random. The WDS 100 is therefore coupled to the network interface module 30 to monitor these failed connection attempts. Using heuristic techniques, the WDS 100 determines whether any of the processes 20 are infected based on whether the failed connection attempts associated with a process 20 are non-normal.

Figure 2:
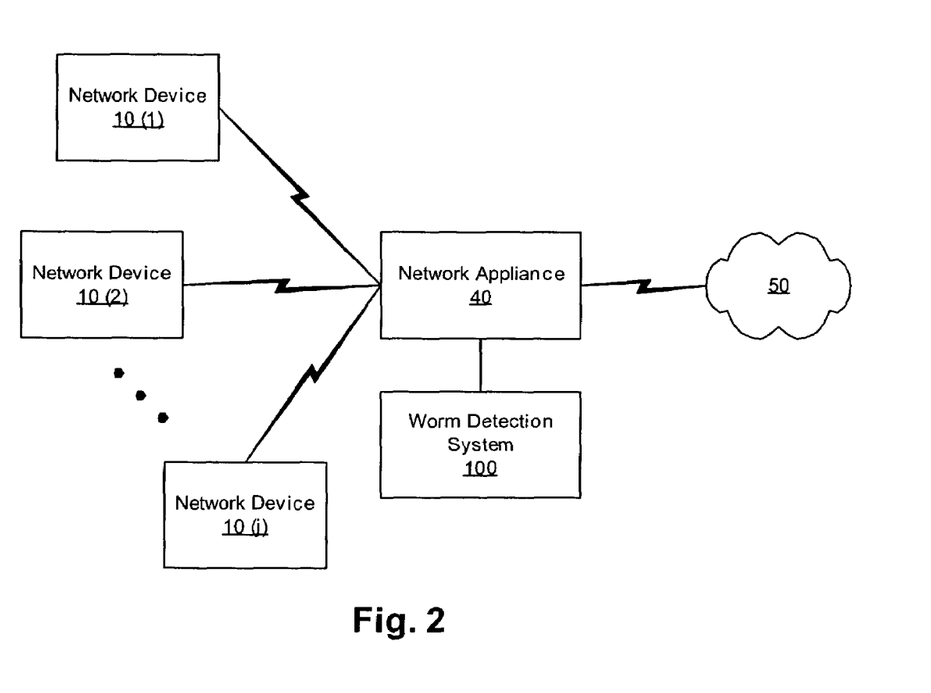
FIG. 2 is a block diagram of a network-based embodiment of the present invention.

FIG. 2 is a diagram of a "network-based" embodiment of the present invention. This embodiment (and variations thereof) is similar to the host-based embodiment in which a WDS 100 observes failed network connection attempts from a set of sources. In this embodiment, however, the sources are network devices 10, not individual processes 20 running thereon. The network devices 10 are coupled to a network 50 and are capable of transmitting messages to remote systems—such as connection attempts to destination addresses on the network 50. These connection attempts are handled by a network appliance 40 while being transmitted to the network 50. The network appliance 40 can be a network firewall, a switch, a router, or any network appliance that has access to connection attempts from network devices 10. The WDS 100 is coupled to the network appliance 40 for observing these connection attempts. The WDS 100 may be implemented within the network appliance 40 in full or in part, or it may be separately implemented and coupled to the appliance 40. The WDS 100 of the network-based embodiment implements a similar heuristic as that of the host-based embodiment. In this case, the WDS 100 determines whether any of the network devices 10 (i.e., sources) are infected, based on whether the failed connection attempts associated with a network device 10 are non-normal.

The heuristic for any of the embodiments can take a variety of forms, as the failed connection attempts associated with a particular source can be quantified in many ways. In one embodiment, the heuristic is implemented with a set of threshold criteria that embodies whether the failed connection attempts associated with a source are non-normal. A worm is thus declared (i.e., that a particular source is infected with a worm) when the source's failed network connection attempts during a period of time meet or exceed at least one of the threshold criteria. In various embodiments, the threshold criteria include any one or a combination of the following metrics:

(1) the number of failed network connection attempts;
(2) the diversity of destination network addresses associated with the failed network connection attempts;
(3) the randomness of the failed addresses; and
(4) a weighting for each failed network connection attempt according to an attribute thereof (e.g., source or destination address).

Moreover, different threshold criteria may be applied to different sources depending on the source. In addition to applying different threshold criteria, a set of sources may be excluded completely from the threshold criteria. These and various other types of suitable threshold criteria are discussed in further detail below.

Although the threshold criteria may simply include the number of failed network connection attempts, it may also be useful to include the diversity of the destination addresses of the failed attempts in the criteria. A source is more likely to be infected if the number of unique addresses of its failed connection attempts is high. For example, a legitimate program might attempt to reconnect to a particular address many times, in which case the diversity would be relatively low. On the other hand, a computer worm is likely to attempt to connect to many different addresses, which would lead to a relatively high diversity. Therefore, failed attempts to a small number of addresses may or may not indicate malicious behavior, but failed attempts to many addresses is a significant indicator of—and thus a good heuristic for—a computer worm. Most legitimate applications will not have a high number of failed connection attempts, even to a small set of distinct addresses. Used in combination, the number of failed attempts and the diversity thereof can be a useful heuristic for detecting a computer worm and avoiding false positives. For example, even where diversity is extremely high, there is likely to be no problem if the actual number of failed attempts is low. Likewise, a high number of failed attempts with low diversity (i.e., failed attempts to the same address) may indicate a network error rather than a computer worm.

In one embodiment, the diversity of failed network connection attempts is quantified by the number of unique addresses to which a connection attempts failed during a specified time period. Alternatively, the diversity can be measured by the number of unique failed addresses relative to the total number of failed attempts, e.g., given as a percentage of the total number of failed attempts. The diversity of failed addresses can also be quantified by collecting the addresses into a subnet mask, the size of the subnet mask indicating the diversity. A larger subnet mask indicates a more diverse set of failed connection attempts.

In another embodiment, the heuristic includes a correlation of target addresses with whether a prior domain name server (DNS) lookup was performed for the failed network connection attempts. This can be implemented, for example, by including in the threshold criteria a correlation with a prior DNS lookup having not been performed before an associated failed network connection attempt. Computer worms typically do not perform a DNS lookup before attempting a connection to a given address, whereas legitimate programs usually resolve a text-based address via DNS before attempting a connection. The heuristic can be configured to ignore failed connection attempts that can be correlated with prior DNS lookups from the same entity performing the failed connection attempt. Alternatively, the heuristic can be configured to give greater weight to failed connection attempts where no prior DNS lookup is performed, rather than ignoring altogether those failed attempts where a prior DNS lookup was performed. This strategy avoids allowing the heuristic to be easily defeated by a worm programmed to perform a simple DNS lookup, while still increasing the reliability of the heuristic and avoiding false positives.

In another embodiment, the threshold criteria are based on historical data for failed connection attempts and the diversity thereof that are obtained over time. These collected data are taken and defined as typical failure rates for normal operating conditions. The threshold specifies a deviation from the normal operating conditions such that an observed actual condition outside this specified deviation is considered non-normal. For example, the threshold can specify a percentage increase over normal connection failures rates and/or destination address diversity. The WDS 100 thus declares a computer worm when it detects rates above these thresholds. This technique allows for the threshold criteria to be dynamic, adapting to the particular operating environment of each system.

The actual thresholds chosen for detecting a computer worm are design parameters and thus depend on the particular application of the WDS 100. For example, the thresholds can be chosen based upon empirical data for a given situation. The thresholds can be set very strictly (high) to avoid false positives, or they can be set less strictly (low) for greater security. Typical computer worms are designed to spread very rapidly, so they tend to cause a significantly higher number of failed connections and diversity thereof compared to normal conditions. Accordingly, relatively strict thresholds are still expected to detect these worms reliably. However, it is possible that creators of computer worms in the future will design worms that are more subtle, causing fewer failed connection attempts or lower diversity thereof (e.g., by attempting to connect to the same address several times before giving up, or over a long period of time). In such a case, these thresholds can be easily reconfigured to catch new breeds of worms.

In addition, the time period during which the threshold is measured is a parameter that can be set depending on the system requirements. Setting a short period leads to quicker detection but allows for less data to be gathered. Long periods allow for more data and are thus more reliable, but they allow a computer worm to operate for longer before being detected.

In another embodiment of the threshold criteria, the failed attempts are weighted according to an attribute thereof, such as the source 10,20 of the failed attempt or the destination address. This allows the heuristic to be fine tuned, for example, to increase the indication of malicious behavior when a particular source 10,20 has a failed connection attempt to a suspect address.

In another embodiment, different threshold criteria are applied to different sources 10,20 depending on the source. Accordingly, the threshold criteria allow for stricter limits on certain sources while allowing looser limits on other sources, enabling the heuristic to be highly configurable. This function can be employed to avoid false positives (i.e., declaring a computer worm where the source 10,20 is not infected) in cases where a source's failed connection attempts are expected to be legitimately above the set threshold criteria. For example, mail servers naturally have more failed attempts, and a higher diversity thereof, because they perform operations like responding to spam email. Setting the mail server's threshold criteria differently (higher, in this example) than other sources' threshold criteria helps to avoid false positives associated with the mail server while not reducing the heuristic's effectiveness in detecting worms in other sources 10,20.

To allow for legitimate network administration tools such as network scanners and vulnerability assessment tools, another embodiment of the invention includes support for exclusions in the threshold criteria. Exclusions can be supported by excepting particular addresses from being logged as a failed connection attempt, or by excluding a particular process or a particular host computer from being subject to alert or termination. Additionally, there are many ways of supporting exclusions, and the exclusions can be configured to exclude completely a source 10,20, or to exclude particular source-destination address combinations.

FIG. 3 shows an embodiment of the WDS 100, which comprises a group of operatively coupled modules including a network monitoring module 110, a logging module 120, a logged data module 130, a criteria data module 140, an analysis module 150, and a response module 160. As used herein, the term "module" refers to computer program logic and/or any hardware or circuitry utilized to provide the functionality attributed to the module. A module may be implemented in hardware, software, firmware, or any combination thereof. In addition, any of the modules or a portion thereof may be stored and/or executed by a remote device coupled to the WDS 100.

The flowchart of FIG. 4 illustrates the operation of the WDS 100 according to an embodiment of the present invention. The network monitoring module 110 observes 205 a network connection attempt by a source 10,20. The connection attempt and whether the attempt failed are messages transmitted from and to the source 10,20, so accessing these messages allows the network monitoring module 110 to observe 205 network connection attempts. In one host-based embodiment, the network monitoring module 110 is coupled to the network interface module 30 for observing network messages sent by a process 20. In one network-based embodiment, the network monitoring module 110 is coupled to the network appliance 40 to observe 205 the connection attempts.

The network monitoring module 110 can use any suitable method to observe 205 the connection attempts. For example, where the WDS 100 is a computer program running on a UNIX or WINDOWS computer system, the network monitoring module 110 can observe 205 connection attempts using the Libpcap functions to "hook" the network stack. Other methods of observing 205 the connection attempts include implementing a network card shim, hooking the TDI layer, using MICROSOFT Firewall APIs or proprietary APIs, replacing winsock, and implementing a winsock-layered provider. It can be appreciated that a variety of known techniques for observing 205 failed connection attempts are possible and are within the scope of the present invention.

If 210 the observed connection attempt failed, the WDS 100 continues to observe 205 connection attempts. Otherwise, in one embodiment, the WDS 100 determines 215 whether the failed connection attempt is excluded from the heuristic. If 215 the failed connection attempt is excluded, the WDS 100 continues to observe 205 connection attempts. Whether a failed connection attempt is excluded may depend on any of the attempt's characteristics, such as the source of the failed attempt and its destination address, or a combination thereof. The data for determining 215 the exclusion may be stored, for example, in the criteria data module 140.

Otherwise, the logging module 120 logs 220 the failed connection attempt in the logged data module 130. In one embodiment, the data stored in the logged data module 130 for each failed attempt may include the identification of the source 10,20 of the attempt, the destination address, and whether there was a prior DNS lookup. Clearly, the data that must be stored depend on the threshold criteria (described above) selected, such as whether the criteria are based on diversity of destination addresses and/or prior DNS lookup. In addition, a date/time stamp is also included in one embodiment. Because the threshold criteria test the failed connection attempts for a given period of time in one embodiment, the date/time stamp allows the WDS 100 to determine the whether each failed attempt occurred within that time period. Alternatively, the logging module 120 may periodically purge the logged data module 130 of this data; therefore, the time period in which the logged failed connection attempts occurred would be known. This method may be particularly useful when the WDS 100 is implemented in a network appliance 40 having limited data storage capability.

Once the failed connection attempts have been logged 220 (or if there are no failed attempts), the analysis module determines 225 whether any source's failed network connection attempts during a period of time meet or exceed the threshold criteria. The analysis module 150 can be configured to make this determination at regular intervals, at predetermined times, in response to certain events (e.g., a new failed attempt), or upon any other desired schedule. The analysis module 150 can be configured to use any combination of threshold criteria that indicate whether a source's failed connection attempts are non-normal, such as the threshold criteria described above.

If the failed connection attempts associated with any source meet or exceed the threshold criteria, the analysis module 150 declares 230 a computer worm. This declaration by the analysis module 150 indicates that the source is possibly infected with a worm according to the heuristic. Being a heuristic method, this declaration is not necessarily determinative, and it may be combined with additional tests to provide a more accurate detection of the computer worm.

The response module 160 is coupled to the analysis module 150. In one embodiment, when the analysis module 150 declares 230 a worm, the response module 160 responds 240 to the worm attack. The appropriate response depends on the system involved, and it may include alerting a user or system administrator to the computer worm. In one host-based embodiment, the response module 240 terminates the infected process 20. Alternatively, the response module 240 may terminate the network access of the network device 10 that is executing the infected process 20, rather than terminating the process 20 itself. This allows the user to control when and whether a process 20 is terminated (e.g., allowing a user to save before closing an application), while still protecting any other devices coupled to the network 50. In one network-based embodiment, the response module 140 terminates the network access of the infected network device 10.

The above description is included to illustrate the operation of various embodiments of the invention and is not meant to limit the scope of the invention. The scope of the invention is to be limited only by the following claims. For example, a hybrid embodiment incorporates elements from both host and network-based embodiments, wherein the WDS 100 observes connection attempts from a number of processes 20 running on a number of network devices 10. The WDS 100 could then provide the functionality of both embodiments, tracking the network connection attempts of multiple systems on a network to the process level. Accordingly, from the above discussion, many variations will be apparent to one skilled in the art that would yet be encompassed by the spirit and scope of the present invention.

What is claimed is:

1. A computer-implemented method for detecting a worm infection on a set of sources coupled to a network, the method comprising the steps of:
   observing a plurality of failed network connection attempts, each failed network connection attempt originating from one of the sources and directed to a destination network address; and
   responsive to a source's failed network connection attempts during a period of time meeting at least one of a set of threshold criteria, declaring a presence of a worm, wherein the threshold criteria comprise a correlation with a prior DNS lookup having not been performed before an associated failed network connection attempt.

2. The method of claim 1, wherein at least one source is a process running on a network device.

3. The method of claim 2, further comprising the step of:
   responsive to a declaration of a worm, terminating the process associated with the declared worm.

4. The method of claim 1, wherein at least one source is a network device coupled to a network.

5. The method of claim 4, further comprising the step of:
   responsive to a declaration of a worm, terminating network access of the network device associated with the declared worm.

6. The method of claim 1, further comprising the step of:
   responsive to a declaration of a worm, alerting a user.

7. The method of claim 1, farther comprising the step of:
   responsive to a declaration of a worm, alerting a system administrator.

8. The method of claim 1, wherein the threshold criteria further comprise:
   a number of failed network connection attempts; and
   a diversity of destination network addresses associated with the failed network connection attempts.

9. The method of claim 1, wherein the threshold criteria further comprise a weighting associated with at least one of the failed network connection attempts according to an attribute thereof.

10. The method of claim 1, wherein a threshold criterion applied to a source depends on the source, and different threshold criteria are used for different sources.

11. The method of claim 1, wherein the step of declaring a worm comprises excluding a source from the threshold criteria, whereby the source's failed network connection attempts do not cause a presence of a worm to be declared.

12. A computer-implemented method for detecting a worm on a network device, the method comprising the steps of:
   monitoring attempts to connect to a destination network address by any of a set of processes running on the network device;
   logging the process and the destination network address associated with a set of failed connection attempts; and
   responsive to the failed connection attempts associated with a process being determined non-normal, declaring a presence of a worm, wherein the determination of non-normalcy is based at least in part on a correlation with a prior DNS lookup having not been performed before an associated failed network connection attempt.

13. The method of claim 12, further comprising the step of:
responsive to a declaration of a worm, terminating the process associated with the non-normal failed connection attempts.

14. The method of claim 12, further comprising the step of:
responsive to a declaration of a worm, terminating network access of the network device.

15. The method of claim 12, wherein the determination of non-normalcy is based at least in part on:
a number of failed network connection attempts; and
a diversity of destination network addresses associated with the failed network connection attempts.

16. A computer-implemented method for detecting a worm on a network, the method comprising the steps of:
monitoring attempts to connect to a destination network address by any of a set of network devices coupled to the network;
logging the network device and the destination network address associated with a set of failed connection attempts; and
responsive to the failed connection attempts associated with a network device being determined non-normal, declaring a presence of a worm, wherein the determination of non-normalcy is based at least in part on a correlation with a prior DNS lookup having not been performed before an associated failed network connection attempt.

17. The method of claim 16, further comprising the step of:
responsive to a declaration of a worm, terminating network access of the network device.

18. The method of claim 16, wherein the determination of non-normalcy is based at least in part on:
a number of failed network connection attempts; and
a diversity of destination network addresses associated with the failed network connection attempts.

19. A computer program product comprising a computer-readable medium containing computer program code for detecting a worm infection on a set of sources coupled to a network, the computer program code comprising instructions for performing the steps of:
observing a plurality of failed network connection attempts, each failed network connection attempt originating from one of the sources and directed to a destination network address; and
responsive to a source's failed network connection attempts during a period of time meeting at least one of a set of threshold criteria, declaring a presence of a worm, wherein the threshold criteria comprise a correlation with a prior DNS lookup having not been performed before an associated failed network connection attempt.

20. The computer program product of claim 19, wherein at least one source is a process running on a network device.

21. The computer program product of claim 20, the instructions for further performing the step of:
responsive to a declaration of a worm, terminating the process associated with the declared worm.

22. The computer program product of claim 19, wherein at least one source is a network device coupled to a network.

23. The computer program product of claim 22, the instructions for further performing the step of:
responsive to a declaration of a worm, terminating network access of the network device associated with the declared worm.

24. The computer program product of claim 19, wherein the threshold criteria further comprise:
a number of failed network connection attempts; and
a diversity of destination network addresses associated with the failed network connection attempts.

25. A computer program product comprising a computer-readable medium containing computer program code for detecting a worm on a network device, the computer program code comprising instructions for performing the steps of:
monitoring attempts to connect to a destination network address by any of a set of processes running on the network device;
logging the process and the destination network address associated with a set of failed connection attempts; and
responsive to the failed connection attempts associated with a process being determined non-normal, declaring a presence of a worm, wherein the determination of non-normalcy is based at least in part on a correlation with a prior DNS lookup having not been performed before an associated failed network connection attempt.

26. A computer program product comprising a computer-readable medium containing computer program code for detecting a worm on a network, the computer program code comprising instructions for performing the steps of:
monitoring attempts to connect to a destination network address by any of a set of network devices coupled to the network;
logging the network device and the destination network address associated with a set of failed connection attempts; and
responsive to the failed connection attempts associated with a network device being determined non-normal, declaring a presence of a worm, wherein the determination of non-normalcy is based at least in part on a correlation with a prior DNS lookup having not been performed before an associated failed network connection attempt.

27. A system for detecting a worm, the system comprising:
a network monitoring module configured to observe a plurality of failed network connection attempts, each failed network connection attempt originating from any of a set of sources and directed to a destination network address;
a logging module coupled to the network monitoring module for logging the failed attempts; and
an analysis module coupled to the logging module for declaring a presence of a worm responsive to a source's failed network connection attempts during a period of time meeting at least one of a set of threshold criteria, wherein the threshold criteria comprise a correlation with a prior DNS lookup having not been performed before an associated failed network connection attempt.

28. The system of claim 27, wherein the threshold criteria further comprise:
a number of failed network connection attempts; and
a diversity of destination network addresses associated with the failed network connection attempts.

29. The system of claim 27, wherein the threshold criteria further comprise a weighting associated with at least one of the failed network connection attempts according to an attribute thereof.

30. The system of claim 27, further comprising:
a response module coupled to the analysis module, the response module configured to respond to the worm upon a declaration thereof.

31. The system of claim 30, wherein the response module is configured to alert a user of a declared worm.

32. The system of claim 27, wherein at least one source is a process running on a network device, and the response module is configured to terminate the process associated with a declared worm.

33. The system of claim 27, wherein at least one source is a network device coupled to a network, and the response module is configured to terminate network access of the network device associated with a declared worm.

34. The system of claim 27, wherein the analysis module is configured to exclude a source from the threshold criteria, whereby the source's failed network connection attempts do not cause the analysis module to declare a worm.

* * * * *

UNITED STATES PATENT AND TRADEMARK OFFICE
CERTIFICATE OF CORRECTION

PATENT NO.        : 7,159,149 B2
APPLICATION NO. : 10/280586
DATED             : January 2, 2007
INVENTOR(S)       : Spiegel et al.

It is certified that error appears in the above-identified patent and that said Letters Patent is hereby corrected as shown below:

At claim 7, column 8, line 34, please change "farther" to --further--.

Signed and Sealed this

Twenty-seventh Day of March, 2007

JON W. DUDAS
*Director of the United States Patent and Trademark Office*